(12) United States Patent
Tsai

(10) Patent No.: US 7,553,013 B2
(45) Date of Patent: Jun. 30, 2009

(54) EYEGLASSES HAVING QUICK LENS RELEASE FEATURE

(76) Inventor: York Tsai, No. 75-11, Lin 5, Hsi-Ting, Kuang-Tien Tsun, Feng-Lu Hsiang, Chiayi Hsien (TW)

( * ) Notice: Subject to any disclaimer, the term of this patent is extended or adjusted under 35 U.S.C. 154(b) by 27 days.

(21) Appl. No.: 11/903,317

(22) Filed: Sep. 21, 2007

(65) Prior Publication Data

US 2009/0079932 A1    Mar. 26, 2009

(51) Int. Cl.
*G02C 1/00* (2006.01)
(52) U.S. Cl. .......................... 351/86; 351/121; 351/154
(58) Field of Classification Search .................. 351/41, 351/83–86, 90–102, 111, 153, 154, 119, 351/121
See application file for complete search history.

(56) References Cited

U.S. PATENT DOCUMENTS 6,086,199 A * 7/2000 Holland et al. ................. 351/86

* cited by examiner

*Primary Examiner*—Huy K Mai
(74) *Attorney, Agent, or Firm*—Curotolo Sidoti Co. LPA; Joseph G. Curatolo; Salvatore A. Sidoti

(57) ABSTRACT

Eyeglasses include a frame: a pair of lenses mounted detachably on the frame; and a pair of temples, each of which is pivoted to the frame so as to be rotatable relative to the frame between folded and extended positions, and each of which is provided with an abutting part that abuts against a respective one of the lenses when the respective one of the temples is disposed at the extended position, and that is spaced apart from the respective one of the lenses when the respective one of the temples is disposed at the folded position.

3 Claims, 5 Drawing Sheets

EYEGLASSES HAVING QUICK LENS RELEASE FEATURE

BACKGROUND OF THE INVENTION

1. Field of the Invention

This invention relates to eyeglasses, more particularly to eyeglasses capable of releasing a set of lenses quickly.

2. Description of the Related Art

In general, conventional eyeglasses with a lens release feature normally include a frame 1, and a pair of removable lenses 2 mounted onto the frame 1 (see FIG. 1). The frame 1 maybe a semi-rimless frame that includes: a bridge structure 11 formed with a pair of protruding parts 111 at lateral ends thereof; a pair of elongated rods 12 respectively extending away from the lateral ends of the bridge structure 11, each of the elongated rods 12 being provided with a first magnet 14 on a lateral end thereof opposite to the bridge structure 11; and a pair of temples 13, each of which is hinged to a respective one of the elongated rods 12.

Each of the lenses 2 is formed with a notch 21 on one side proximate to the bridge structure 11, and is mounted with a second magnet 22 that is disposed opposite to the notch 21. To attach one of the lenses 2 onto the frame 1, the notch 21 is set to engage one of the protruding parts 111, and the second magnet 22 is magnetically attracted to one of the first magnets 14 (see FIG. 1).

However, because the magnets 14, 22 are required to be small, magnetic attraction between the magnets 14, 22 is weak, which can result in loose connection between the lenses 2 and the frame 1. Besides, the lenses 2 are likely to be undesirably removed from the frame 1 upon impact. Therefore, there is a need for eyeglasses constructions that can facilitate stable lens attachment while having a quick lens release capability.

SUMMARY OF THE INVENTION

It is an object of the present invention to provide eyeglasses with a quick lens release feature that can overcome the above drawbacks of the prior art.

According to the present invention, eyeglasses includes a frame: a pair of lenses mounted detachably on the frame; and a pair of temples, each of which is pivoted to the frame so as to be rotatable relative to the frame between folded and extended positions, and each of which is provided with an abutting part that abuts against a respective one of the lenses when the respective one of the temples is disposed at the extended position, and that is spaced apart from the respective one of the lenses when the respective one of the temples is disposed at the folded position.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENT

Figure 1:
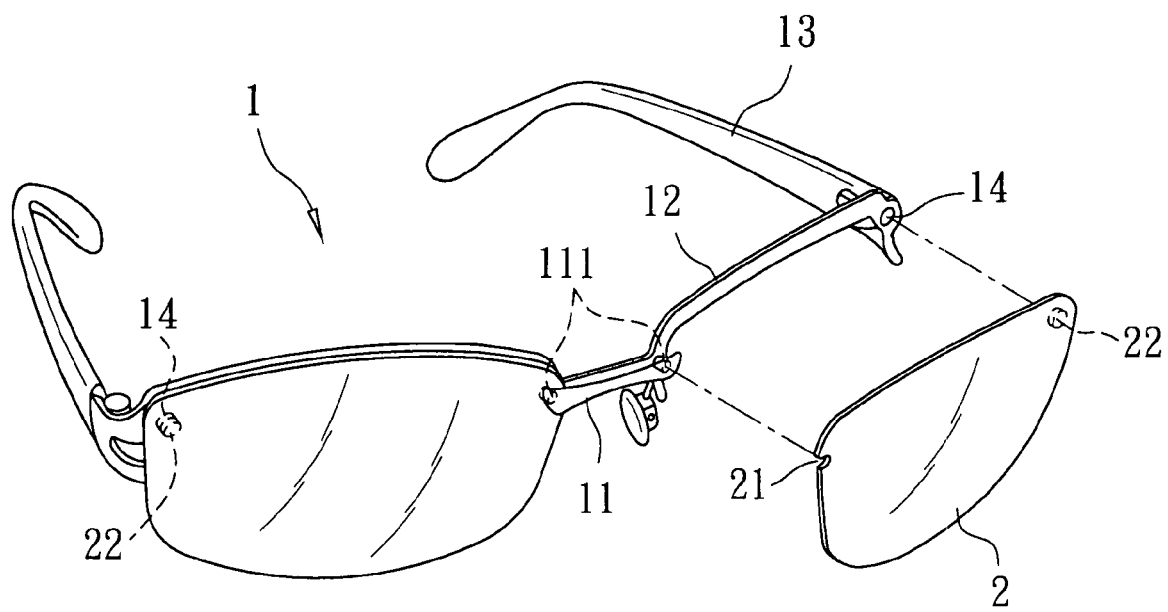
FIG. 1 is a partly exploded perspective view of conventional eyeglasses.

Before the present invention is described in a greater detail with reference to the preferred embodiments, it should be noted herein that like elements are denoted by the same reference numerals throughout the disclosure.

The first preferred embodiment of the present invention is illustrated in FIGS. 2 to 6. The eyeglasses 3 include: a plastic frame 31; a pair of lenses 4 mounted detachably on the frame 31; and a pair of temples 5, each of which is pivoted to the frame 31 so as to be rotatable relative to the frame 31 between folded (see FIG. 5) and extended (see FIG. 4) positions, and each of which is provided with an abutting part 51 that abuts against a respective one of the lenses 4 when the respective one of the temples 5 is disposed at the extended position, and that is spaced apart from the respective one of the lenses 4 when the respective one of the temples 5 is disposed at the folded position. Specifically, the frame 31 has a pair of frame parts 32, each of which defines a frame space 35 that has a lens-receiving portion 34 for receiving a respective one of the lenses 4 therein, and an end portion 33 reduced in size from the lens-receiving portion 34 for receiving the abutting part 51 of a respective one of the temples 5 therein.

The frame part 32 is formed with a rear protrusion 322 protruding rearwardly from a periphery defining the lens-receiving portion 34. Each of the lenses 4 has an end protrusion 41 that extends into the lens-receiving portion 34, that is disposed between the rear protrusion 322 and the abutting part 51 of the respective one of the temples 5, and that abuts against the abutting part 51 of the respective one of the temples 5 when the respective one of the temples 5 is disposed at the extended position. Each frame part 32 is formed with an inner retaining groove 321 for receiving a peripheral edge of the respective one of the lenses 4. Each frame part 32 has an end wall portion 323 that defines the end portion 33 of the frame space 35, and that is formed with upper and lower retaining grooves 331. The abutting part 51 of each of the temples 5 is provided with a pivot pin 512 that has upper and lower ends respectively extending into the upper and lower retaining grooves 331 in the end wall portion 323 of the respective one of the frame parts 32.

Figure 2:
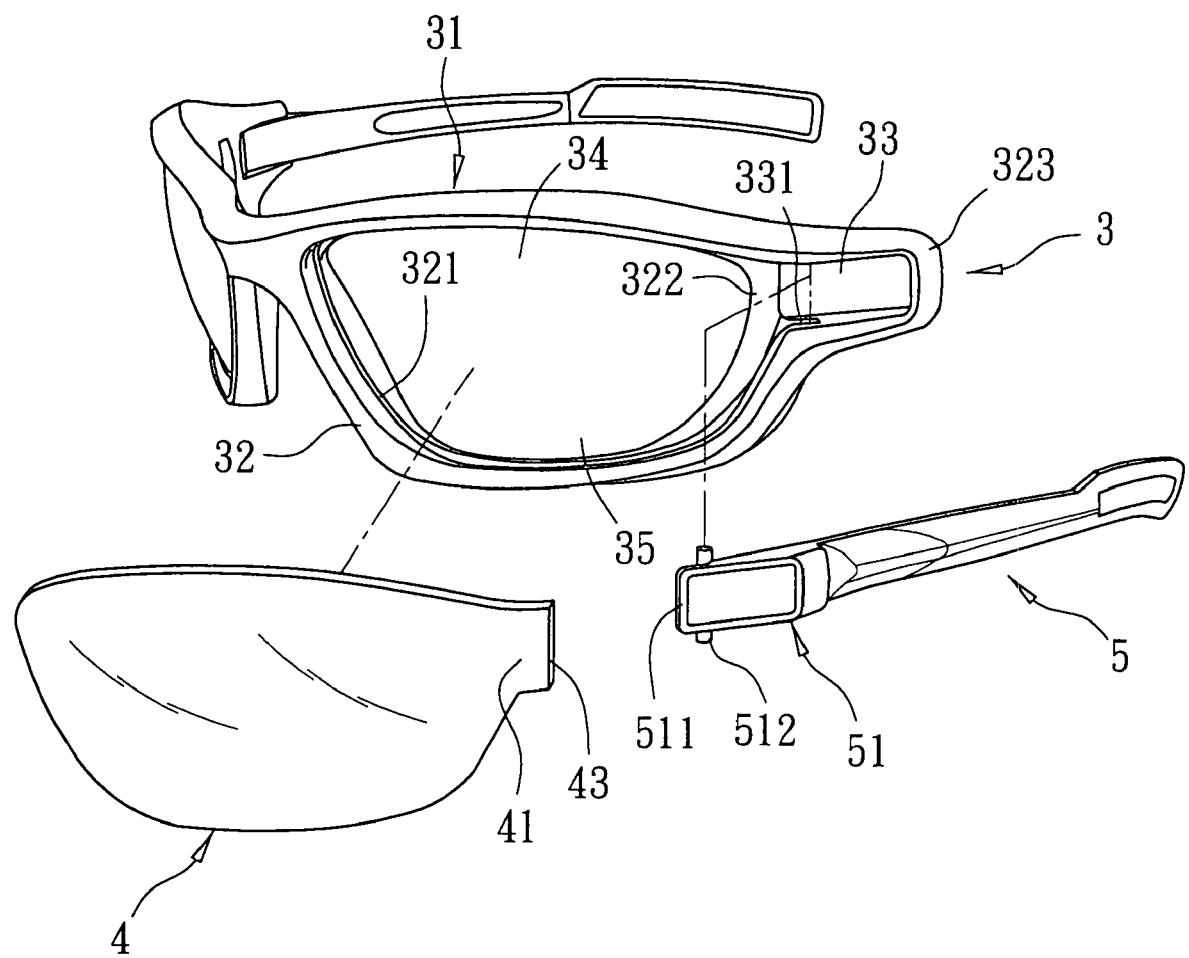
FIG. 2 is a partly exploded perspective view of the first embodiment of the eyeglasses according to the present invention.
Figure 3:
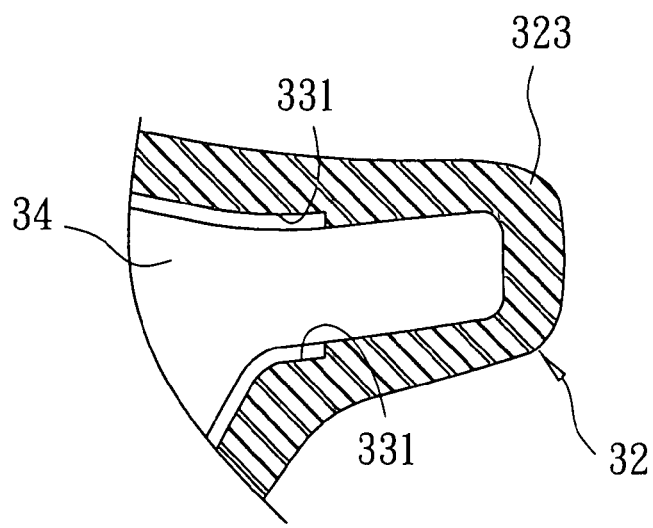
FIG. 3 is an enlarged fragmentary sectional view showing upper and lower retaining grooves of an end wall portion of a frame part of the first preferred embodiment.
Figure 4:
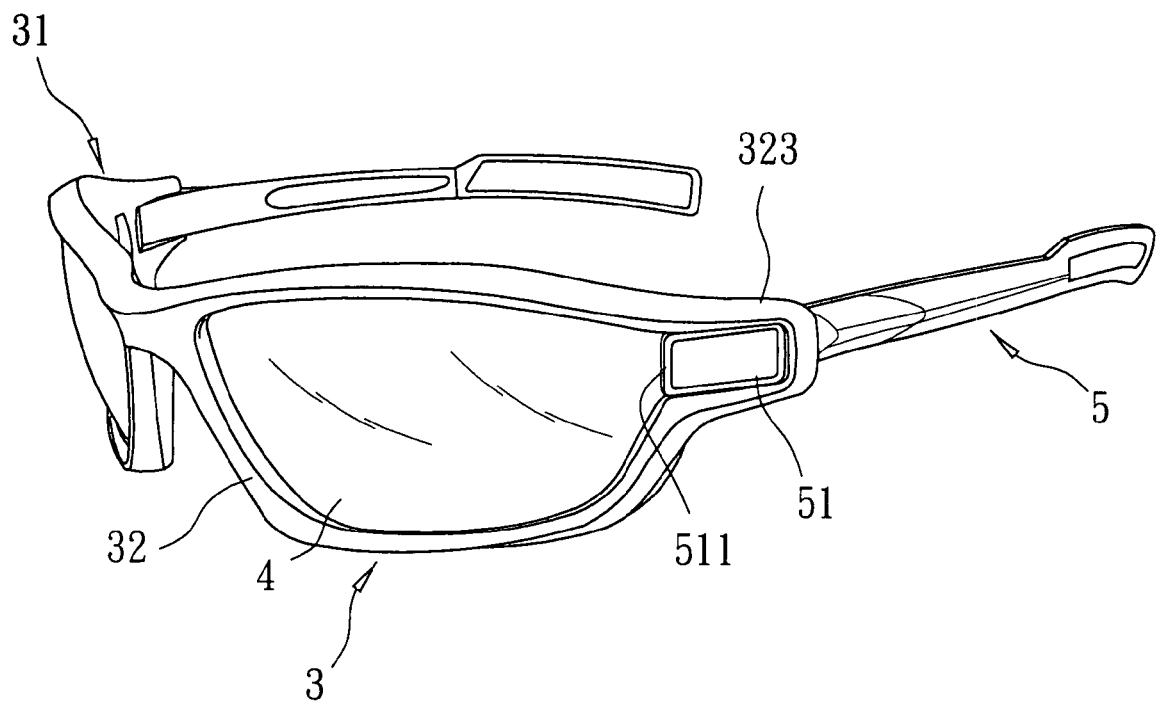
FIG. 4 is a perspective view showing temples of the first preferred embodiment disposed at an extended position.

As shown in FIGS. 2 and 4, when the temples 5 are disposed at the extended position, the lenses 4 are seated securely inside the frame parts 32. To facilitate proper insertion of the lenses 4, the temples 5 are first folded so as to allow the frame parts 32 to receive the lenses 4. In practice, the rear protrusions 322 of the frame parts 32 prevent undesired removal of the lenses 4 from behind. The pivot pin 512 abuts laterally against an end face 43 of the end protrusion 41 of the respective lens 4 so as to prevent lateral movement of the respective lens 4. The abutting part 51 has an abutting section 511 abutting against a front face of the respective lens 4 when the respective temple 5 is disposed at the extended position.

Figure 5:
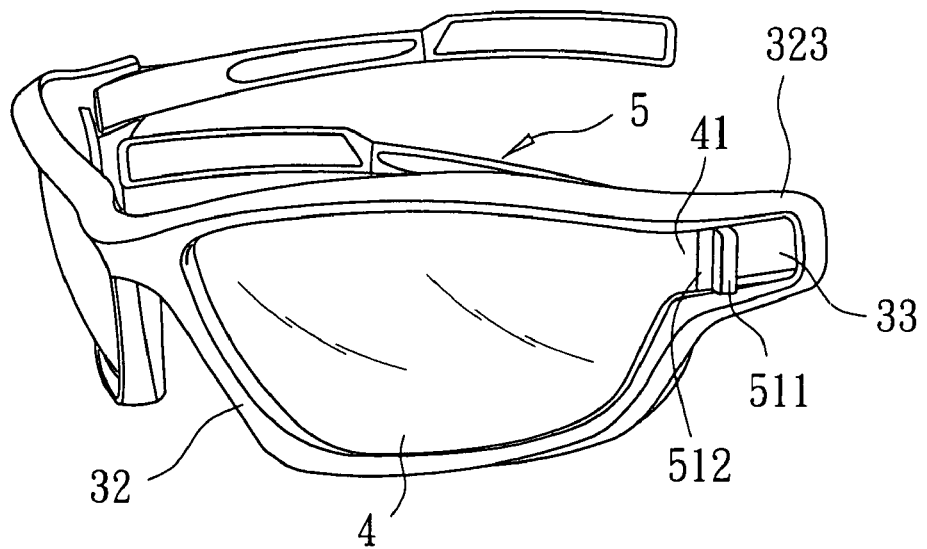
FIG. 5 is a perspective view showing one of the temples of the first preferred embodiment disposed at a folded position.
Figure 6:
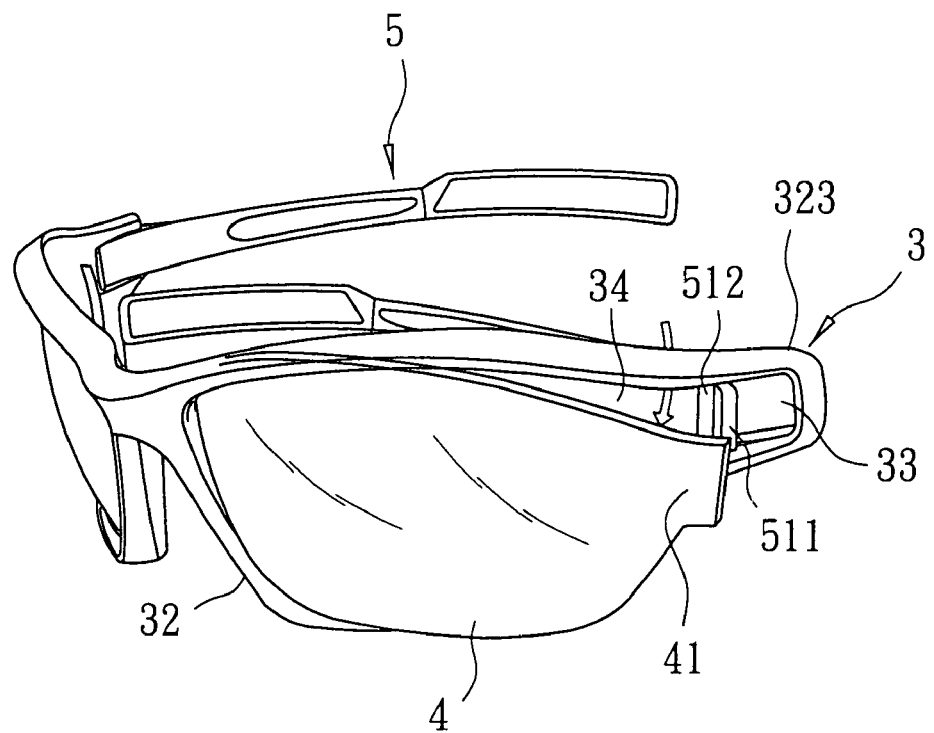
FIG. 6 is a perspective view showing how a lens is detached from the frame of the first preferred embodiment.

Quick release of the lenses 4 from the frame 31 is permitted when the temples 5 are pivoted to the folded position. With reference to FIG. 5, the abutting section 511 of the abutting part 51 disengages from the front face of the end protrusion 41 of the respective lens 4 so as to permit removal of the respective lens 4 when the respective temple 5 is disposed at the folded position. At this same, the lens 4 is still received in the lens receiving portion 34 of the frame space 35 in the respective frame part 32 due to friction between the periphery of the lens 4 and the respective frame part 32. The temples 5 can be removed from the frame 31 after removal of the lenses 4 from the frame 31, as best shown in FIG. 6. Note that each of the upper and lower retaining grooves 331 is in spatial communication with the frame space 35 and terminates at an end of the lens receiving portion 34 of the frame space 35, thereby permitting sliding movement of the abutting part 51 into the lens-receiving portion 34 of the frame space 35.

Figure 7:
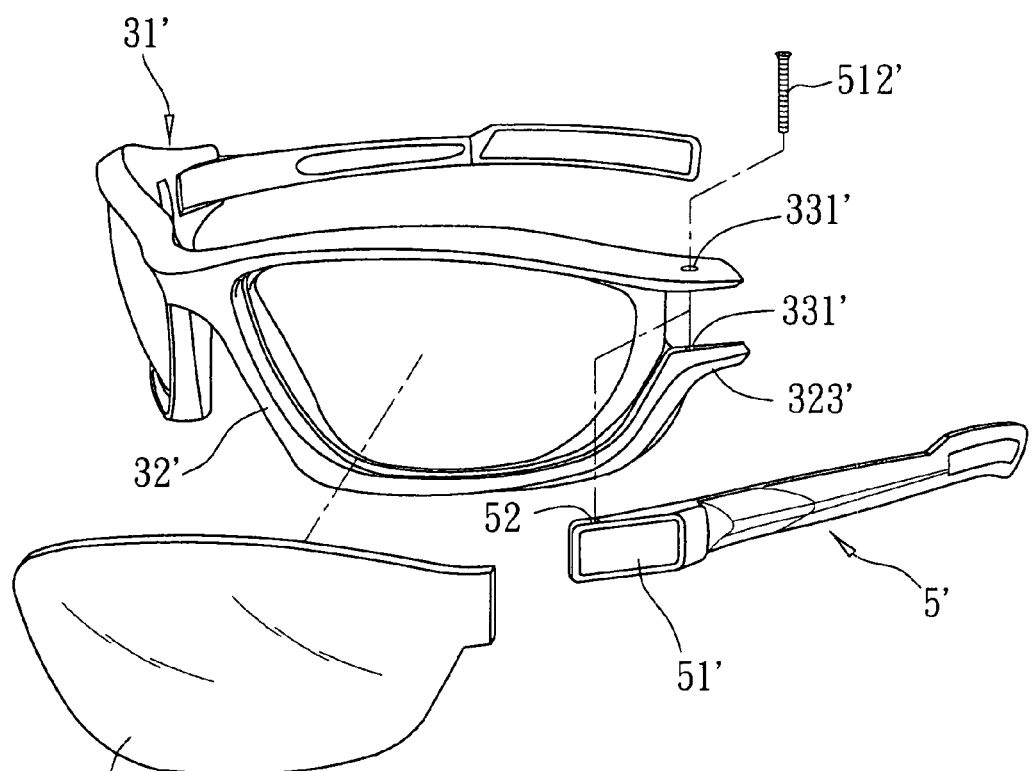
FIG. 7 is a partly exploded perspective view showing the second preferred embodiment of the eyeglasses according to the present invention.

FIG. 7 illustrates the second preferred embodiment of the present invention. In this embodiment, each of the upper and lower retaining grooves 331' in the end wall portion 323' of each frame part 32' of the frame 3' is in the form of a through-hole. The abutting part 51' of each temple 5' is formed with a bore 52 therethrough for receiving the pivot pin 512'. The pivot pin 512' may be in the form of a bolt or screw. The end wall portion 323' of each frame part 32' is secured to the a butting part 51' of the respective temple 5' by extension of the pivot pin 512' into the bore 52, and the upper and lower retaining groove 331'.

Figure 8:
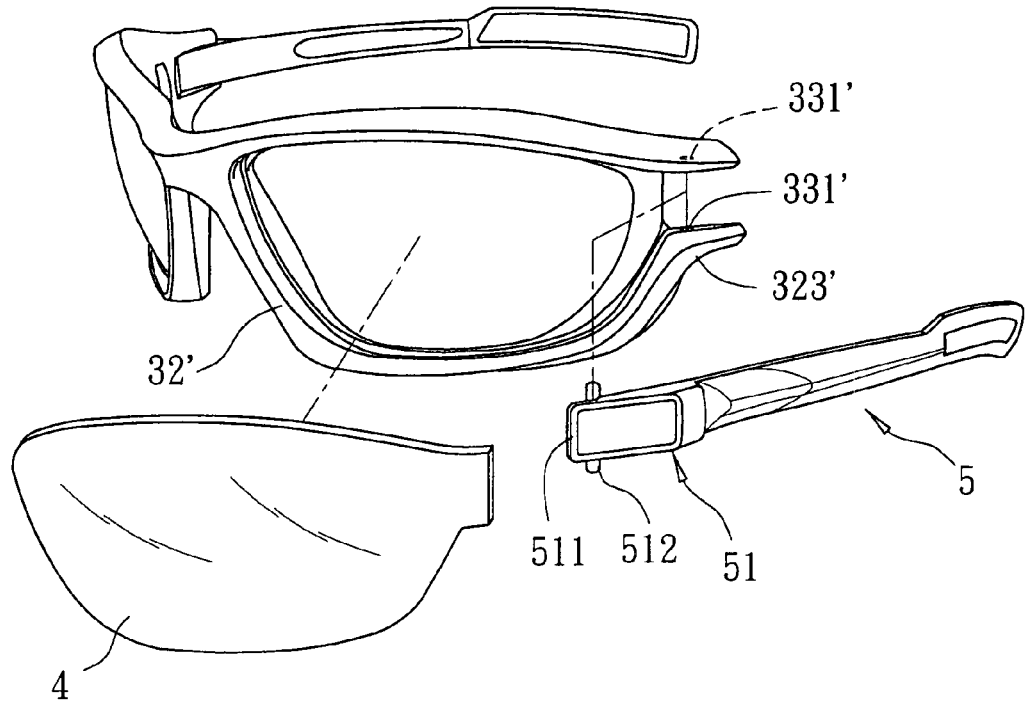
FIG. 8 is a partly exploded perspective view showing the third preferred embodiment according to the present invention.

Referring to FIG. 8, the third preferred embodiment of the present invention differs from the first preferred embodiment in that each of the upper and lower retaining grooves 331' is in the form of a through-hole. The frame 31' is designed such that the end wall portion 323' of each frame part 32' can be flexed slightly in order to allow the respective temple 5 to disengage from the frame part 32'.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. Eyeglasses comprising:

a frame;

a pair of lenses mounted detachably on said frame; and a pair of temples, each of which is pivoted to said frame so as to be rotatable relative to said frame between folded and extended positions, and each of which is provided with an abutting part that abuts against a respective one of said lenses when the respective one of said temples is disposed at the extended position, and that is spaced apart from the respective one of said lenses when the respective one of said temples is disposed at the folded position;

wherein said frame has a pair of frame parts, each of which defines a frame space that has a lens-receiving portion for receiving a respective one of said lenses therein, and an end portion reduced in size from said lens-receiving portion for receiving said abutting part of a respective one of said temples therein; and wherein each of said frame parts has an end wall portion that defines said end portion of said frame space, and that is formed with upper and lower retaining grooves, said abutting part of each of said temples being provided with a pivot pin that has upper and lower ends respectively and slidably extending into said upper and lower retaining grooves in said end portion of a respective one of the frame parts.

2. The eyeglasses of claim 1, wherein each of said frame parts is formed with a rear protrusion protruding rearwardly from a periphery defining said frame space, each of said lenses having an end protrusion that extends into said lens-receiving portion, and that is disposed between said rear protrusion and said abutting part of the respective one of said temples and that abuts against said abutting part of the respective one of said temples when the respective one of said temples is disposed at the extended position.

3. The eyeglasses of claim 1, wherein each of said frame parts is formed with an inner retaining groove for receiving a peripheral edge of the respective one of said lenses.

* * * * *